(No Model.)
W. W. C. JOHNSON.
Plant Setter.
No. 229,139. Patented June 22, 1880.
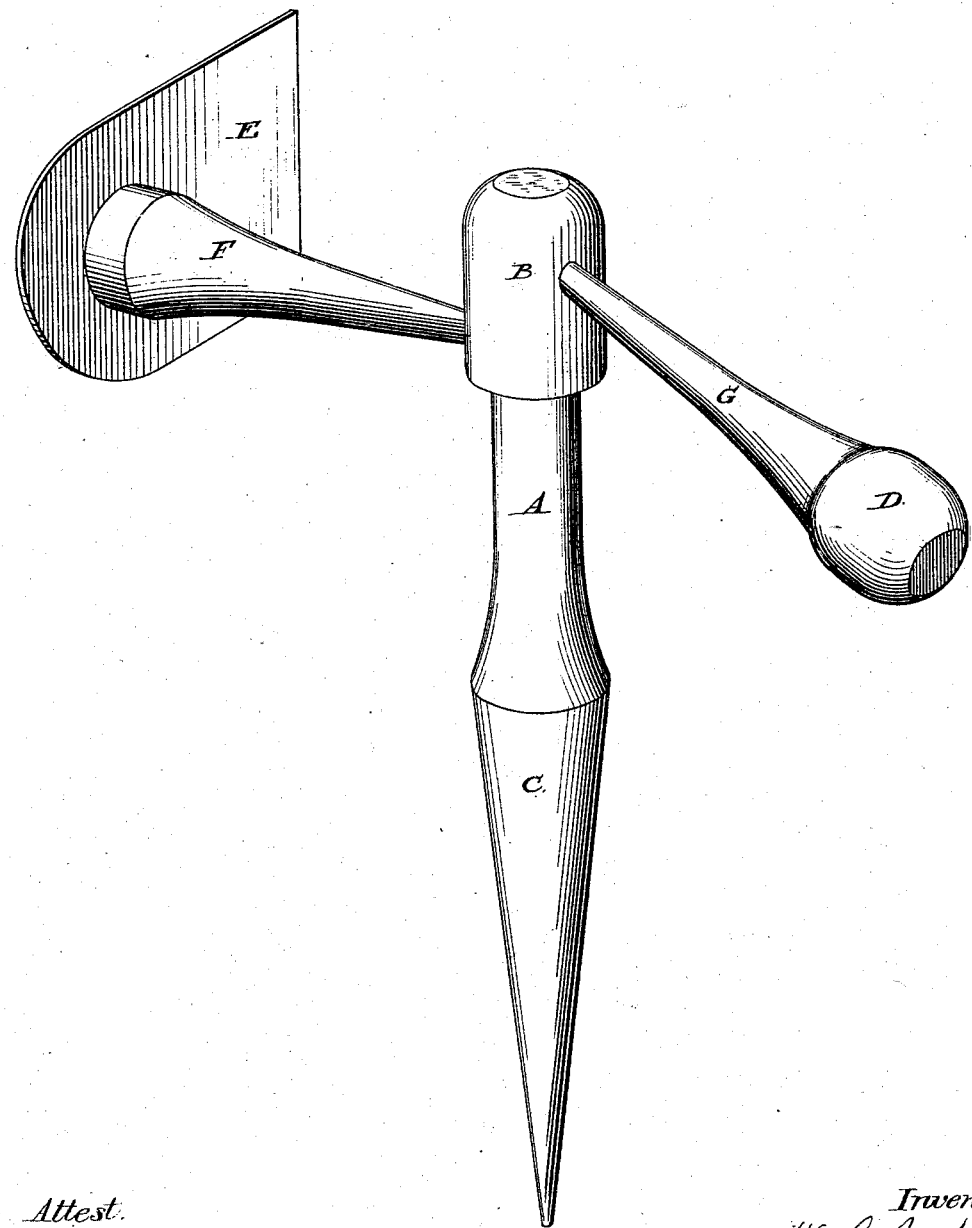
Attest:
Sidney P. Hollingsworth
Nathan C. Lane
Inventor.
William W. C. Johnson

UNITED STATES PATENT OFFICE.

WILLIAM W. C. JOHNSON, OF LEWISBURG, OHIO.

PLANT-SETTER.

SPECIFICATION forming part of Letters Patent No. 229,139, dated June 22, 1880.

Application filed May 22, 1880. (No model.)

*To all whom it may concern:*

Be it known that I, WILLIAM W. C. JOHNSON, of Lewisburg, in the county of Preble and State of Ohio, have invented certain new and useful Improvements in Plant-Setters; and I do hereby declare that the following is a full, clear, and exact description of the invention, which will enable others skilled in the art to which it appertains to make and use the same, reference being had to the accompanying drawing, which forms a part of this specification.

The figure represents my improved plant-setter in perspective.

My invention consists in the construction of an improved implement for setting out tobacco or other plants by the combination in one tool of convenient size and shape of various instruments for performing the several operations of preparing the hill, piercing the earth for the reception of the plant, and pressing the soil about the roots, all as hereinafter set forth.

In the drawing, A marks the shank of the tool; B, the head or handle. C is a pointed metallic socket in which the lower end of the shank A is inserted. D is a rammer whose handle G is inserted in the head B. A hoe, E, is also attached, by its handle F, to the head B.

The several implements composing the tool may be varied in shape and size according to the kind of planting it is desired to perform.

In use, the head B and shank A form a handle, which is grasped by the operator, who first uses the hoe in the preparation of the hill, then makes a hole with the dibbling-point C for the reception of the plant, introduces the plant into the hole, and finally presses the soil about the roots of the plant by means of the rammer D.

Having thus fully described my invention, what I claim, and desire to secure by Letters Patent, is—

The improved plant-setter hereinbefore described, the same consisting of the handle A B, dibbling-point C, hoe E, and rammer D, constructed and combined in the manner and for the purpose set forth.

In testimony that I claim the foregoing as my own I have hereto affixed my signature in presence of two witnesses.

WILLIAM W. C. JOHNSON.

Witnesses:
JOSEPH FORREST,
THEO. MUNGEN.